Oct. 13, 1942.　　　J. A. REDD　　　2,298,628
FLUID BRAKE SYSTEM
Filed March 29, 1940　　　3 Sheets-Sheet 1

Inventor
John A. Redd
By
Robb & Robb
Attorneys

Oct. 13, 1942. J. A. REDD 2,298,628
FLUID BRAKE SYSTEM
Filed March 29, 1940 3 Sheets-Sheet 2
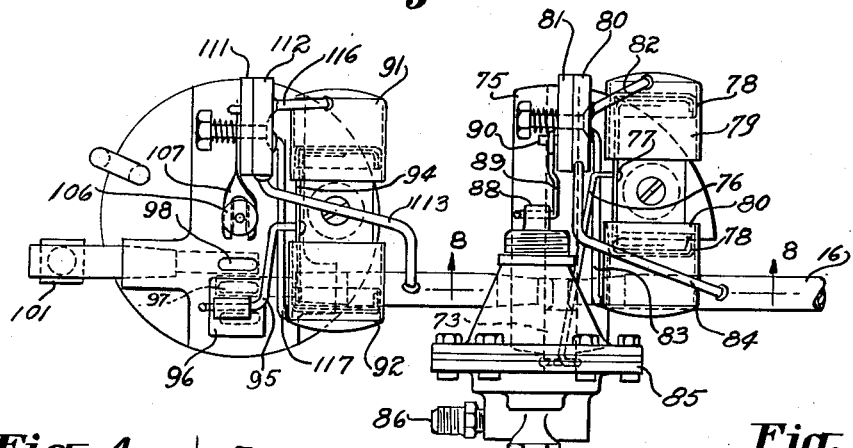
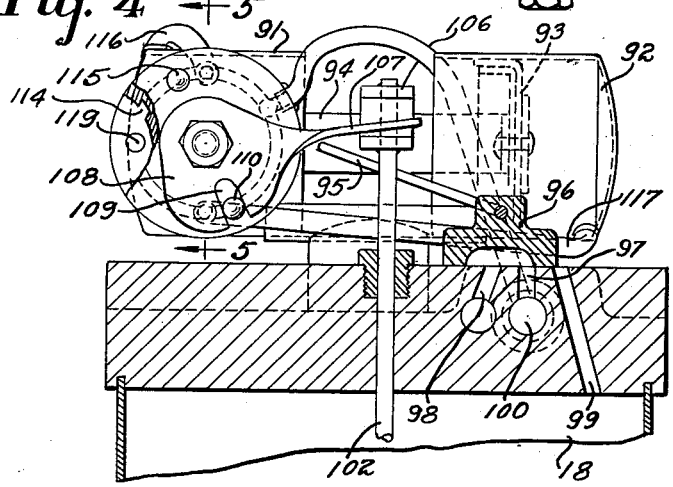
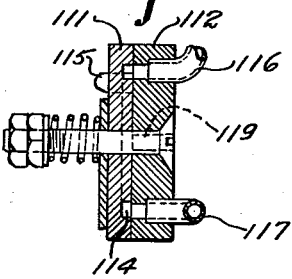
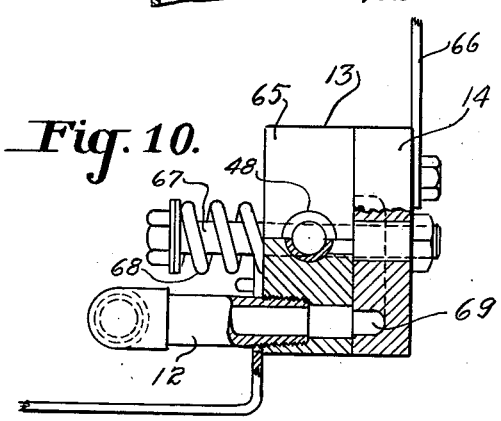
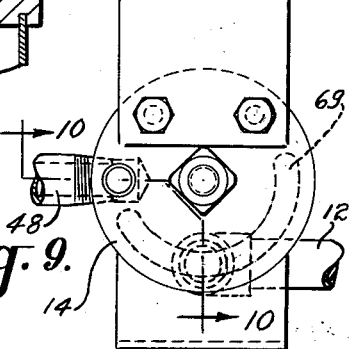

Oct. 13, 1942. J. A. REDD 2,298,628
FLUID BRAKE SYSTEM
Filed March 29, 1940 3 Sheets-Sheet 3
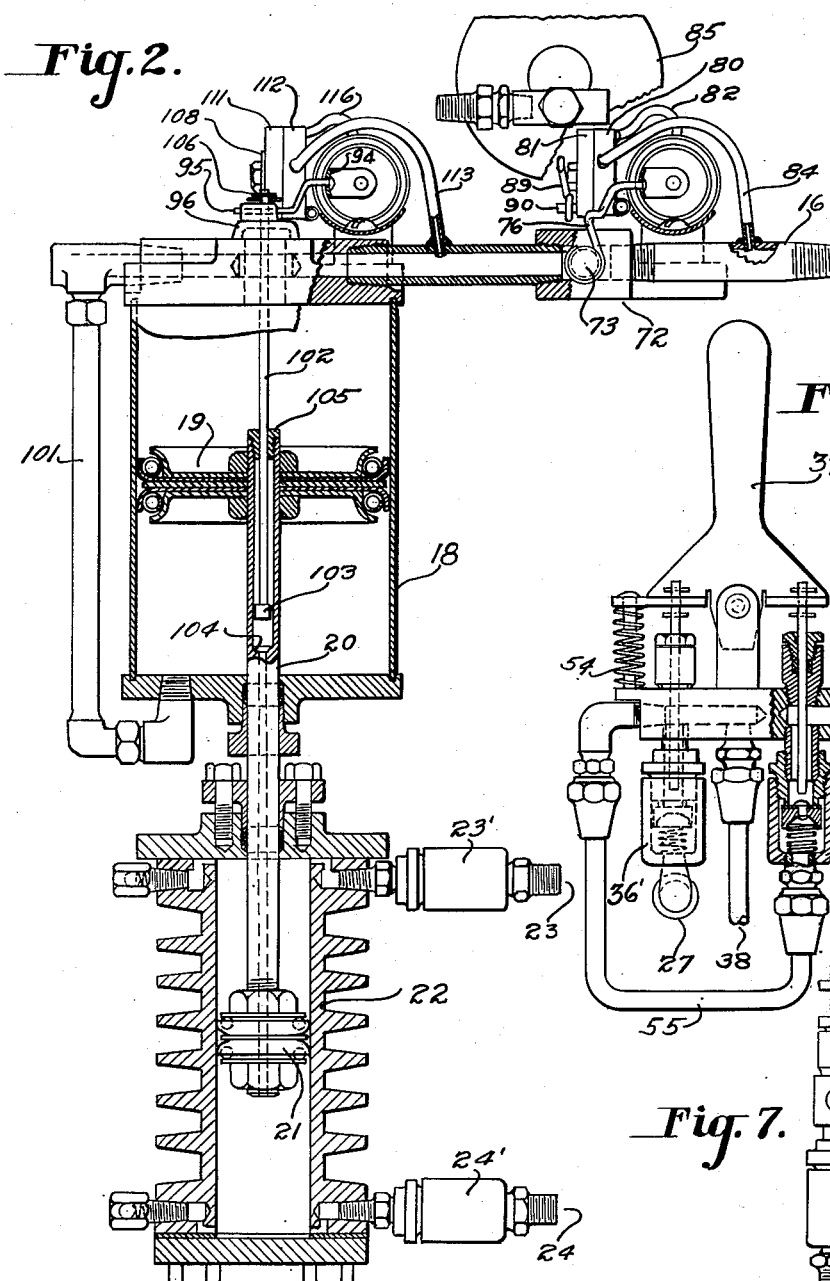
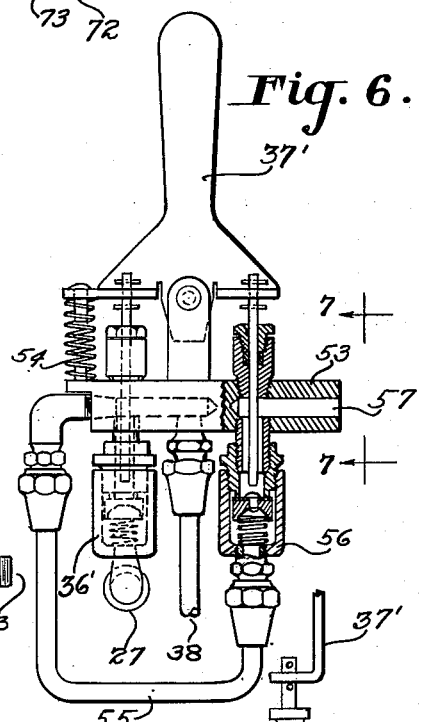
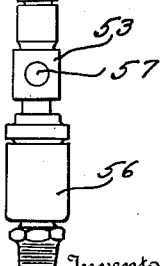
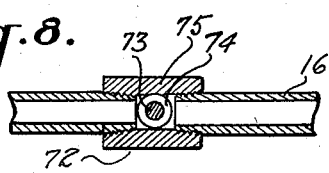

Patented Oct. 13, 1942

2,298,628

UNITED STATES PATENT OFFICE 2,298,628

FLUID BRAKE SYSTEM

John A. Redd, Cleveland, Ohio

Application March 29, 1940, Serial No. 326,775

7 Claims. (Cl. 303—4)

The object of this invention has been to design an efficient braking system for trucks and for vehicle combinations, such as traction vehicles connected to trailer vehicles.

The invention comprises in regard to its essential features of novelty, the provision of braking means on the traction vehicle adapted to be operated by manual control through the application of vacuum in a conventional type of brake cylinder, as an initial means for application of brakes to the wheels of the traction vehicle.

Additional provision is made whereby said manual operation may be supplemented incident to a movement of the same, after the initial application of the brakes by the vacuum method, to admit air under pressure to the brake cylinder of the traction vehicle, whereby greater braking effect supplementing that produced by the vacuum instrumentalities may be obtained.

The invention contemplates the employment of a single or common control lever such as a foot pedal for the operation of said vacuum and air systems by which the brakes of the traction vehicle or truck are preliminarily applied, and if desired, applied with greater application by the use of the air force acting in said brake cylinder.

The invention involves, additionally, an automatic pump by which compressed air may be supplied to the supply air cylinder on the traction vehicle, which automatic pump is operated by vacuum controlled instrumentalities of an automatic type.

The invention further embodies automatic means whereby when the compressed air in the air supply tank on the traction vehicle reaches a certain compression or poundage limit, the automatic pump, above referred to, is thrown out of operation, and the supplying of air to said cylinder is thus discontinued.

When the air supply in the supply cylinder aforesaid reduces below the pre-set maximum desired to be maintained normally, the automatic instrumentalities by which the action of the pump is discontinued, work to reinstate said action and commence again the operation of the pump to bring the supply of air in the air cylinder to its proper maximum desired to be maintained.

The invention further involves the association with the normally used brake mechanism, comprising the manual or pedal instrumentalities previously referred to, of emergency brake means involving an emergency brake control lever that may be manually actuated at any time to practically instantly supply air to the brake cylinder of the traction vehicle, and thus secure the immediate functioning of the brakes in an emergency, with a maximum degree of braking force at the traction wheels of the vehicle.

The said emergency brake control means is likewise useful for application of the brakes when the traction vehicle is stopped in order to lock the vehicle against movement.

Where the vehicle means with which the invention is used, comprises a combination tractor and trailer vehicle, the invention contemplates the employment of supplemental brake means on the trailer vehicle operated incident to the operation of the brake means on the tractor vehicle, together with provisions such that if the coupling means between the vehicle should be broken, certain valves connecting the vacuum and air lines of the two braking systems of the vehicles, will be closed thereby to prevent the incapacitating or rendering inoperative of the brake system of the traction vehicle and causing at the same time an emergency application of the brakes of the trailer vehicle, all as will be hereafter more fully pointed out, in the following description, and accompanying drawings, in which:

Figure 1 is a diagrammatic lay-out view of the braking systems used for a combination tractor and trailer vehicle, certain of the wheels of the vehicles being roughly illustrated in conjunction with the convenient brake instrumentalities applied thereto, and the general system of vacuum and air lines, between the various controlling parts and the mechanisms operated thereby, are depicted in a general showing of the system.

Figure 2 is largely a sectional view through the vacuum controlled working cylinder and piston and the pump units; also showing the automatic reversing valve for the said working piston, and the automatic cut-off valve means for the vacuum line pipe connection that leads to the vacuum operated working cylinder and piston unit.

Figure 3 is a top plan view showing more particularly a portion of the vacuum line and the automatic reversing valve and cylinder and piston unit, together with the diaphragm motor and cut-off valve unit features.

Figure 4 is a view partially in section, and partly broken away, and partly in elevation, of the upper end of the vacuum cylinder containing the working piston that operates the pump and bringing out more clearly the valve features forming a part of said mechanism.

Figure 5 is a sectional view of the type of rotary valve employed in conjunction with the units illustrated at the left portion of Figure 3, and the left portion of Figure 4.

Figure 6 is a view in elevation and partly in section, bringing out more clearly the emergency air valve mechanism which is also similar to the auxiliary air brake valve mechanism associated with the foot pedal.

Figure 7 is a detail view of a portion of the valve operating parts shown in Figure 6.

Figure 8 is a sectional view on the line 8—8 of Figure 3.

Figure 9 is a detail view of the foot pedal operated valve in the vacuum line connection between the engine manifold and main brake cylinder of the traction vehicle, said line connection leading also to the brake cylinder of the traction vehicle.

Figure 10 is a side elevation of the foot operated valve, shown partly in section along the line 10—10 of Figure 9.

Figure 1:
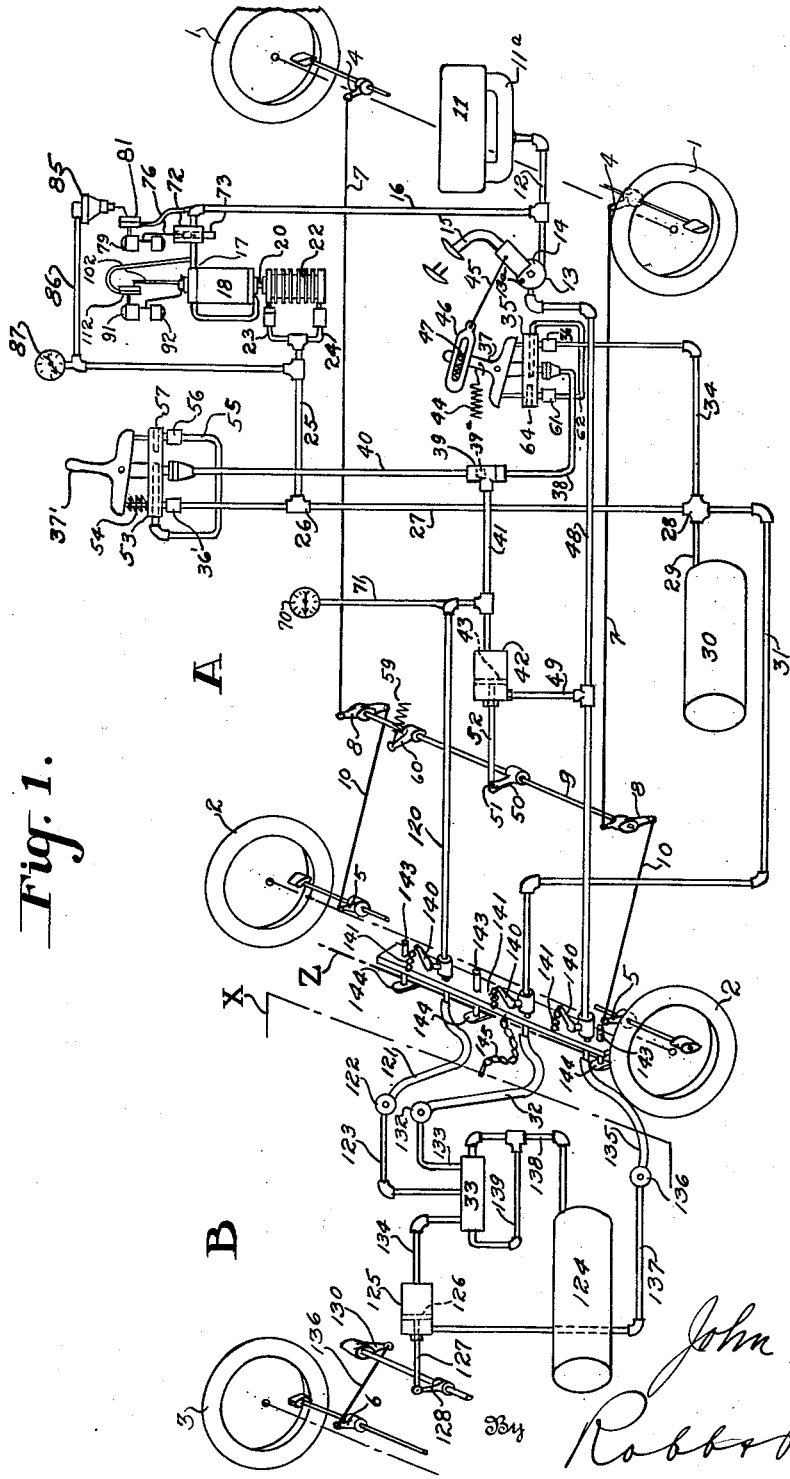

Describing the operating features of the invention, and their disposition upon the tractor and trailer vehicles A and B respectively, as diagrammatically illustrated in Figure 1, it is notable that the front wheels of the traction vehicle are designated at 1 and the rear wheels at 2, the chassis or frame of the vehicle being entirely omitted. Only one of the front wheels 3 of the trailer vehicle is shown. The traction vehicle is equipped in the usual manner with front brake arms 4, by which to actuate the brakes of the front wheels 1 and with rear brake arms 5 by which to actuate the brakes of the rear wheels 2. The front wheels of the trailer vehicle B are equipped with brakes, as usual, operated by brake arms 6 on wheel 3, and one brake arm only being illustrated. The brake arms 4 of the traction vehicle are connected by rods 7 with the upper arms of brake levers 8 carried by a shaft 9. The lower arms of the brake levers 8 are connected by rods 10 to the brake arms 5 of the rear wheels 2.

A suitable conduit or piping system is employed for conducting pressure fluid or supplying vacuum in vacuum lines to certain parts of the various mechanisms of the invention.

At 11 is illustrated diagrammatically the engine or motor of the traction vehicle, the manifold of which is connected by a pipe 12 with a valve casing 13, seen best in Figures 8 and 9, the valve 14 associated with said casing being connected with the foot brake pedal 15 located as usual above the footboard of the cab of the traction vehicle or any equivalent vehicle to which the invention may be applied. The pedal 15, therefore, works the valve 14, as will be later described.

From the pipe 12 leads a pipe 16 that constitues a vacuum line connected at 17 with a vacuum cylinder 18, in which is mounted an actuating piston 19, see Figure 2, said piston connected by a piston rod 20 with the air pump piston 21 in the pump cylinder 22, which may be located below or at one end of the cylinder 18.

The pump cylinder 22 is connected by branch pipes 23 and 24 and one-way valves 23' and 24' at its upper and lower ends respectively, with an air line pipe 25 which in turn is connected at 26 with an air pipe 27 that leads to a union 28 from which the air pipe 29 extends to a point of connection with the compressed air cylinder 30. The union 28 also connects an air pipe 31 through the means of a flexible housing or conduit 32 on the trailer B so that compressed air is capable of being supplied to the casing of the valve 33 from the cylinder 30 as long as the trailer B is in connected or coupled position to the traction vehicle A.

From the union 28 associated with the pipes just described, a pipe 34 leads to a valve casing 35 of a valve device of the general type shown in Figure 6, except that in the view of Figure 6, the parts of the valve device proper are reversed left to right from the arrangement illustrated in Figure 1. The pipe 34 is directly connected to supply air to the casing of the valve device 35 when a valve 36 of the valve device or unit 35 is opened by rocking of the lever 37 to the right, as shown in Figure 1. This rocking of the lever 37 may be accomplished by depressing or pushing down on the foot pedal 15. Air entering the casing of the valve unit 35 when the valve 36 is opened is adapted to pass through a portion of the casing so as to enter a pipe 38 which leads to the casing of a two-way valve 39 at one end of said casing.

From the other end of the casing of the valve 39 leads a pipe 40 to an emergency valve unit 53 to be later described. From the middle of the casing of the valve 39, a pipe 41 leads to the front end of a brake cylinder 42 in which is disposed a brake piston 43 shown in dotted lines. The valve 39 is a two-way valve, and the valve member 39a thereof moves upwardly to permit air to pass from the pipe 38 to the pipe 41 and cut off the passage of air to the pipe 40. Said valve 39 moves downwardly in its casing in order to permit air to pass from the pipe 40 to the pipe 41 and cut off the passage of such air to the pipe 38.

A spring 44 normally tends to put the lever 37 of the valve unit 35 rearwardly and such movement is communicated to the brake pedal 15 by a rod 45 attached to a yoke 46 having a slot receiving a pin 47 therein. A spring in the slot of the yoke 46 bears against the pin 47 at one end, and at its opposite end bears against the rear end of the yoke itself.

It has been described that the vacuum line pipe 12 leads from the manifold 11a of the motor 11 to the valve casing 13, and the movement of the pedal 15 is adapted to do two things. First, the said pedal movement will establish the vacuum line connection between the pipe 12 and a pipe 48 that leads from the casing 13 to a branch pipe 49 communicating with the front end of the brake cylinder 42. Thus the opening of the communication between the pipes 12 and 48, 49 and the cylinder 42 supplies the necessary vacuum or suction at the left side of the brake piston 43 shown in Figure 1 so as to cause preliminary application of the brakes by reason of the actuation of the lever arm 50 on the shaft 9 through its connection 51 with the piston rod 52 of said piston 43.

From the foregoing it will be seen that operation of the piston 43 may be produced through its connection with the vacuum line 49—48—13 and 12 to the manifold 11a and that by reason of subsequent actuation of the valve unit 35 through the connection of the pedal 15 with the lever 37 additional operating action of the piston 43 for effective brake functioning operation may be produced by the supplying of air from the tank 30 through the air line pipes 29, unit 28, pipe 34, unit 35, pipe 38, valve 39, and pipe 41, to the right hand end of the cylinder 42 and the right hand side of the piston 43 as seen in Figure 1.

Under the above conditions, there has been set forth generally the action of the apparatus of the invention in effecting the application of the brakes for the wheels 1 and 2, involving a preliminary movement of the brake pedal 15 to connect the left end of the cylinder 42 with the vacuum line over to the engine manifold 11a. Subsequent movement of the pedal 15 downwardly will effect the operation of the valve unit 35 and if the braking forces obtained on the wheels 1 and 2 are not sufficient, the additional downward movement of the pedal 15 will function to actuate the valve unit 35 and open up the air lines leading from the compressed air cylinder 30 to the brake cylinder 42 to supplement the action of the vacuum line and introduce ample compressed air into the air lines described to act upon the side of the piston 43 opposite the vacuum line connection and thereby produce sufficient final braking action at the wheels 1 and 2 to secure the highest efficiency of braking performance of the brakes for the traction vehicle A.

This brings us to the valve unit 53, seen in Figure 1, as arranged to supply compressed air from the tank 30 through the pipes 27 and 40 past the valve 39 to the pipe 41 directly from the latter to the cylinder 42. The valve unit 53 is similar to the valve unit 35, previously described, all of the parts being practically the same so far as illustrated, except that in lieu of the spring 44, which cooperates with the lever 37, the corresponding lever 37' of the unit 53 is normally held in a position such as shown in Figure 1 by a spring 54.

The upper arm of the lever 37' constitutes a handle because the valve unit 53 is to be manually operated as an emergency valve means for quickly supplying emergency air to the air end of the cylinder 42 to act upon the piston 43 for the application of the brakes. The emergency action of the unit 53 may be availed of whenever desired, during the travel of the vehicle A, and also it will be availed of when the vehicle is stopped, and it is desired to apply the brakes with the force of the compressed air in the cylinder 42.

It will be understood in reference to the valve unit 53 that normally the valve 36' thereof is closed so as to cut off communication between the tank 30 through the pipe 27 to the pipe 40 and from thence on to the cylinder 42. At such time in the normal position of the valve 36' and lever 37' any air in the cylinder 42 is adapted to exhaust therefrom through the pipe 41 past the two-way valve 39 through the pipe 40, the casing of the valve unit 53 from the said casing through the by-pass pipe 55 past the valve 56 and out of the casing of the unit 53 at the exhaust opening 57, the valve 56 being open when the lever 37' is in the position shown in Figure 1 permitting the valve 56 to remain open under the action of the spring 54.

As customary in brake apparatus to which this invention is applied, some suitable means will act normally on the brake piston 43 as for instance release spring means for the brakes to tend to move the piston 43 to its rightward limit of movement in the cylinder 42 as shown in Figure 1.

For this purpose, if desired, a spring 59 may be connected to an arm 50 on the brake shaft 9 that carries the brake lever arm 50.

It is to be understood also that when the brake pedal 15 is up or in its unoperated position, the valve 36 is closed and the valve 61 in the by-pass pipe 62 is open. This permits, upon the release of the pedal 15 after operation which effects the closing of the valve 36, the opening adjustment of the valve 61 so that air in the air end of the cylinder 42 may exhaust therefrom through the pipe 41, past the valve 39, through the pipe 38, the casing of the valve unit 35, the by-pass pipe 62 and past the valve 61, to the exhaust port 64 to the atmosphere.

Likewise, it is necessary that when the pedal 15 is in its unoperated position, the valve 14 shall be closed, so that the vacuum line 12 is not connected to the pipes 48 and 49, thereby to permit the brakes at the wheels 1 and 2 to remain in released condition.

*Brake pedal control valve*

Describing in detail the valve unit 13, reference has been made heretofore to Figures 9 and 10 in this connection, and it is noted that the valve 13 includes the casing 65 with which the pipe 48 is connected, as previously described, and also includes the valve member 14 attached directly by a plate 66 to the foot pedal 15. The valve member 14 is a rotary valve part held in place on the casing by the pivot axis 67, the members 14 and 65 being pressed together by a coupled spring 68, after well known practise.

The valve member 14 has an arcuate passage valve 69 therein adapted to connect the port in the casing 65, at which the pipe 48 is attached with a similar part in the casing at which the vacuum line pipe 12 is attached.

It will be obvious that by depressing the pedal 15, the valve member 14 will be turned, and will thereby shift the valve passage 69 to establish communication between the ports just referred to in relation to the pipes 12 and 48, thereby permitting the vacuum in the pipes 12 and 48, 49, and the left end of the cylinder 42 to act upon the piston 43 for effecting operation of the brakes at the wheels 1 and 2. As previously suggested, further movement of the pedal 15 will rock the control lever 37 and in this manner compressed air will be supplied to the brake cylinder 42, if necessary or desired, in order to supplement the vacuum compelled movement of the piston 43 by the application of air pressure to the piston at the opposite side thereof.

In many cases where the vehicles are to be slowed down, rather than stopped, the vacuum action on the piston 43 is sufficient without the final movement of the pedal 15 that supplies the air pressure against said piston.

It will be noted that valve 13 is provided with an atmospheric port 13a that is caused to be connected with line 48 when the brake pedal 15 is in the up or neutral position to vent the cylinder 42 and release the brakes upon restoration of the pedal 15 to said neutral position.

*Discontinuing operation of air pump*

It will be obvious that it is unnecessary to continue the compression of air pumped into the air cylinder 30 after a certain maximum compression point for the air in said cylinder is reached. A gauge 70 is connected by a pipe 71 with the air line pipe 41, and it is contemplated that when this gauge shows a predetermined poundage of pressure of the air in the cylinder 30, the pumping of additional air thereto will be discontinued. For this purpose, a cut-off valve is utilized, and is illustrated in Figures 2, 3 and 8, also in Figure 1 diagrammatically. The valve designated is 72, and comprises a sliding valve member 73, having an annular groove 74 therein, which groove permits the vacuum line pipe 16 to be operative for the vacuum to act upon the piston 19 when the groove portion of the member 73 is opposite the end portions of the pipe 16, which are connected by the casing 75 of the valve 72.

In other words, the valve 72 is interposed in the length of the vacuum line pipe 16 at some desirable point, and by shifting the sliding valve member 73 to one position, said member constitutes a cut-off in the length of the pipe 16, whilst in a second position, the grooved portion 74 establishes communication between the sections of the pipe 16 connected by the valve casing 75.

The means to operate the valve member 73 includes a rod 76 that is connected at one end with the valve member 73, and having its opposite end connected, as seen at 77, with a plate or bar that connects together the pistons 78 in the piston cylinders 79 and 80, see Figure 3, and the top right portion of the view, Figure 1.

The operation of the pistons 78 is under vacuum control from the vacuum line 16 and is effected in the following manner. A valve device comprising a casing 80 and a rotary valve 81 similar to that shown in Figure 5, is availed of. From the casing 80 a pipe 82 runs to the upper end of the cylinder 79 and another pipe 83 runs to the lower end of the cylinder 80. Vacuum action is carried in to the casing 80 by a pipe 84 leading to a point of connection with the vacuum line pipe 16. A diaphragm motor 85 is connected by a pipe 86 having the gauge 87 interposed in its length, to the air line pipe 25 previously described as leading away from the pump cylinder 22.

The actuating rod 88 of the diaphragm motor 85 is connected by a rod 89 with a pin 90 by which the valve 81 is rotated. When the compressed air supply tank 30 has been filled with air up to a certain maximum desired compression or poundage, the diaphragm motor 85 will be operated to shift longitudinally its actuating rod 88 and thus turn the valve 81 to establish communication between the pipe 16 through the pipe 84 and pipe 76 to the lower end of the cylinder 80. The vacuum pull will, under such conditions, move the pistons 78 in the cylinders 79 and 80 downward, as seen in Figure 3, and through the rod 76, the valve 73 will be moved to shut off communication between the vacuum line pipe 16 and the working cylinder 18. Thereupon, the piston 19 will cease its operation, and the pumping piston 21 will stop pumping air through the pipes 23, 24, 25 and 27, to the air supply cylinders 30.

*Operation of the vacuum operated working piston and air pump*

It is desired, of course, to operate the pump comprising the cylinder 22 and piston 21, automatically. The mechanism for doing this is shown best in Figures 2, 3, 4 and 5. Certain of the parts of the vacuum cylinder 18 and pump have already been referred to.

It will be recalled that the vacuum line pipe 16 is connected to the upper end of the cylinder 18, and that the pistons 19 and 21 are connected by the piston rod 20. At one end of the cylinder 18 is arranged a control unit somewhat similar to that described in reference to the parts 79 and 80 previously set forth. This control unit includes cylinders 91, and 92, containing pistons 93, both of which are like the piston illustrated in Figure 4, in dotted lines.

The pistons 93 are connected by a bar or plate 94 so as to move together. The bar or plate 94 is connected by a rod 95 with a slide valve 96 which is operative to control ports 97, 98 and 99 in the adjacent end or head of the cylinder 18. The purpose of the valve 96 is to connect the vacuum line port 100 which is connected with the pipe 16 with either the port 98 or the port 99. The port 98 communicates with a passage in the end of the cylinder 18 that is connected with the upper end of the by-pass pipe 101. In turn, the port 99 directly leads in to the upper end of the cylinder 18 from the atmosphere.

The purpose of the valve 96, therefore, is to be reciprocated to connect the ports 97 and 98 as shown in Figure 4, under which condition, the vacuum in the vacuum line pipe 16 from the manifold 11a will act at the lower end of the cylinder 18 to pull the piston 19 downwards imparting a working stroke to the piston rod 20 and effecting a pumping action of the piston 21 in an obvious manner.

Furthermore, opposite movement or reciprocation of the valve 96 will connect the port 97 with the port or passage 99, and the vacuum in the pipe line 16 will act at the upper end of the cylinder 18 to move the piston 19 upwardly and impart a working stroke to said piston and the piston 21 in an opposite direction to that previously just mentioned.

The control unit by which the movement of the valve 96 is effected, as previously suggested, includes the cylinders 91 and 92, the pistons 93 therein connected by the bar or plate 94 and the rod 95. The control unit is again operated under the influence of the vacuum in the vacuum line pipe 16 as rendered effective at the manifold 11a of the motor 11.

With the above in mind, it is noted that the piston rod 20 is made hollow at its upper portion and an actuating rod 102 is adapted to slide therein in a limited manner, the lower end of the rod 102 carrying an abutment 103 to be engaged by a shoulder 104 in the rod 20 in one direction of movement of the rod and to be engaged by a nut abutment 105 in an opposite direction of movement of the rod 20.

The actuating rod 102, see also Figures 2 and 4, has an abutment 106 at its upper end external to the cylinder 18 coacting with the arm 107 of a lever 108 having a notch 109 engaging a stud 110 on the rotative valve 111, which valve is shown in Figure 5, as similar to the valve 81, and is associated with the casing 112, see Figure 5 and Figure 3.

The purpose of the lever 108 is to turn the valve 111 in one direction, as the piston 19 and its rod 20 reach the upper limit of movement in the cylinder 18, and move the valve 111 in an opposite direction, as the piston 19 and rod 20 approach the lower limit of movement in the cylinder 18. The valve casing 112 is connected by a pipe 113 with the vacuum line pipe 16, and the valve 111 has an annular passage 114 therein. The said annular passage is divided into two sections by stud 115 and the stud 110. Leading from the casing 112 is another pipe 116 that connects to the end of the cylinder 91, and also leading from the said casing 112 is another pipe 117 that extends to a point of communication with the outer end of the cylinder 92.

The pipes 116 and 117 lead in to the casing 112 at about diametrically opposite points in the passage 114. As the piston 19 and rod 20 move upwardly, the shoulder 104 at a certain time will abut with the part 103 of the actuating rod 102 and rock the lever 108 through the connection 106 so as to turn the valve 111 and cause the studs 115 and 110 to be shifted sufficiently that the passage 114 and the pipe 113 will be in communication with the pipe 116 so that the vacuum in the pipe line 16 will act upon the piston 93 in the cylinder 91 and thereby carry the valve 96 to the left to occupy the position shown in Figure 4, and establish communication between the vacuum line 16 and the lower end of the cylinder 18.

This will cause the downward working stroke of the piston 19 working the pumping piston 21 in a similar direction. The valve casing 112 has a bleed port or passage 119 leading to the atmosphere which port is connected with the pipe 117 through the annular passage 114 of the valve 111 when the valve occupies the position in Figure 4.

As the piston 19 moves downwardly and approaches its lower limit of movement, the nut abutment 105 will strike the abutment 103 of the rod 102 and shift the lever arm 107 downwards to turn the valve 111 in a clockwise direction, as seen in Figure 4, to thereby move the studs 115 so that they pass the points of connection of the pipes 116 and 117 with the casing 112. Under these conditions, the vacuum is caused to function through the pipe 117, and pipe 116 will be connected to atmosphere, this action drawing the piston 93 to the right, as seen in Figure 4, and shifting the valve 96 similarly to the right so that said valve 96 connects the vacuum line 16 at the port 100, with the passage 99 that previously was open to the atmosphere.

Thus through this communication of the parts 100, 97 and 99, the vacuum in the line 16 will act on the upper side of the piston 19 and the movement 19 will be reversed so that it produces an upward working stroke that is communicated to the piston 21 to effect the upward pumping stroke of the latter.

By the above operation, it will be understood that so long as the pressure of the air in the tank 30 is below a fixed maximum, that is desired to be maintained therein, the vacuum line 16 will be open by reason of the position of the valve 73 and the vacuum in the line 16 will be effective under such conditions to maintain automatic reciprocation of the piston 19 through the employment of the automatic control unit which is particularly shown at the left in Figure 3, and fully in Figure 4.

Very largely speaking, the control unit at the left in Figure 3 is similar to the piston and valve unit at the right in Figure 3, though the two units are employed for different purposes, in the first instance, the unit operating as an automatic device for reversing the position of the valve 96, and in the second instance, the unit operating as an automatic device acting under the operation of the motor diaphragm 85 to effect a cut-off action or restoring action on the part of the valve 73, as regards the cutting off or efficient use of the vacuum in the line 16.

*Trailer brake connections and operation*

The view of Figure 1 shows diagrammatically at X the front line or end of the trailer vehicle frame or chassis, and at Z the rear end of the traction vehicle frame or chassis. The air line 41 is connected by a pipe 120 and flexible hose 121, coupling 122 and pipe 123 with the emergency brake valve 33 previously mentioned as carried by the trailer.

On the trailer is mounted the auxiliary air tank or reservoir 124 and the brake cylinder 125 of conventional type having a brake piston 126 therein, shown in dotted lines. The piston 126 is connected by its rod 127 with the lever arm 128 on the operating shaft 129, which is connected by arm 130 and rod 136 to the rocker arm 6 that actuates the brakes for the wheels B of the trailer.

The air line pipe 31 is connected by the hose 32 before mentioned, coupling 132, and pipe 133, with the emergency brake valve 33. From the casing of the valve 33 a pipe 134 leads to the auxiliary brake cylinder 125. The vacuum line pipe 48 is connected by a hose 135, coupling 136 and pipe 137 to the cylinder 125. Auxiliary air cylinder 124 is connected by pipe 138 to the emergency valve 33, and a by-pass pipe 139 leads from the pipe 138 to the end of the casing of the valve 33 opposite that with which the pipe 138 connects.

Cut-off valves 140 are located on the pipes 120, 31 and 48, adjacent to the rear end of the traction vehicle frame, and are connected by chains or flexible members 141 to the slide plate 142 mounted on said frame. The plate 142 is directly supported by pins 143 carried by abutment lugs 144.

The trailer vehicle is, of course, coupled to the traction vehicle in the customary way, as by a fifth wheel coupling or where four wheeled trailers are used, by a pintle hook.

If the coupling between the trailer vehicle and the traction vehicle brakes, the chain 145 which is an auxiliary connection between the front end X of the trailer vehicle and the plate 142 of the traction vehicle, becomes taut, strain is thus placed on the plate 142 to pull the same rearwardly on the pins 143, and the rearward movement of the plate 142 in this manner exerts a pull upon the chains 141 and closes out of the valves 140.

Of course, subsequently to the closing of the valves 140, the chain 145 and the hose connections 121, 32 and 135 will be broken. However, since the valves 140 are previously closed, the mechanism just described, provides a safety device for cutting off or closing the rear ends of the vacuum line pipe 48 and the air pipes 120, and 31, thus preventing incapacitating of these pipes by opening them to the atmosphere.

After the connections above referred to are broken, by reason of the provision of the emergency brake valve 33, the latter will act to automatically supply air from the cylinder 124 to the brake cylinder 125, and the brakes of the trailer will be set to stop the same even though the traction vehicle has become disconnected therefrom. The emergency brake valve 33 is of a conventional type known to those versed in the art at the present time, and its action therein does not have to be described.

*General operation*

Summarizing the general operation of the invention, it is notable that as long as the pressure in the air tank 30 is below a fixed normal which is pre-set, the working piston 19 will be operated by reason of its connection to the vacuum line 16, to operate the pump 22 and supply air to the cylinder 30. When the pressure in the tank 30 reaches the maximum desired to be maintained, the diaphragm motor 85 will be operated to actuate the valve 72 and cut off the further supply of air to said tank from the pump 22.

In the ordinary course of operation of the working piston 19, its movement is automatically reversed by the provision of the piston and cylinder unit 91, 92 and 93, and the associated valve 111.

Now in regard to the braking operation of the vehicle, the preliminary downward pressure on the foot pedal 15 operates the valve 14, to enable the vacuum line 12 and other connecting lines leading to the brake cylinder 42 to act on the left side of the piston 43, to apply the brakes of the vehicle. If additional braking force of said brakes is desired, the pedal 15 is further depressed and the lever 37 actuates so as to supply the air from the air cylinder 30 to the right end of the cylinder 42 and this air acting on the piston 43 supplements the vacuum braking action of the said piston 43 and will with great power check the movement of the vehicle by more positive action of the brakes.

It will be understood that under normal conditions of connection between the traction vehicle and the trailer vehicle, the piston 126 in the auxiliary brake cylinder 125 on the trailer will operate in unison with the piston 43 in the main brake cylinder 42 on the traction vehicle. The pipe line connections between the two vehicles are desired to facilitate the last mentioned result.

In the event of a desired very quick action of the brakes in an emergency, or to apply the brakes when the traction vehicle and its trailer vehicle are stopped, to lock the vehicles against movement, the emergency control unit 53 is operated through its lever 37' to cause air to be supplied directly to the brake cylinder 42, and to the auxiliary brake cylinder 125 on the trailer in the manner previously described.

On breakage of the coupling between the traction vehicle and the trailer, the valves 140 close automatically in the manner set forth, whereby to maintain the vacuum and air lines on the traction vehicle operative, and the emergency brake valve 33 thereafter controls an emergency setting of the brakes on the trailer vehicle as set forth.

It will be understood that while the brake cylinder 42 and piston 43 form one kind of a vacuum and fluid pressure controlled device, other types of such brake applying and releasing motors may be availed of. Thus, within the purview of the invention, a diaphragm motor might be substituted for the brake cylinder 42 and the piston 43; also, a vane type piston might be used instead of a sliding piston. In other words, it is contemplated that the annexed claims shall cover in respect to the brake cylinder and piston such equivalents as are common in the art and may be substituted by a mechanic versed in the art for the particular type of means 42—43 illustrated and described.

Having thus described my invention, what I claim as new and desire to secure by Letters Patent of the United States, is:

1. In a brake system for vehicles, in combination, brake mechanism, a brake cylinder and piston for rendering said brake mechanism effective, a vacuum line leading to said cylinder to act at one side of the piston, a source of vacuum connected with said vacuum line, a pressure fluid line leading to said cylinder to act upon the opposite side of the piston, the piston being operable by vacuum from the vacuum line and pressure from the fluid pressure line for brake application purposes, and instrumentalities for controlling the application of vacuum and air pressure to the said piston in a sequential relation, said last mentioned instrumentalities comprising a common control for the vacuum and pressure lines, and separate control instrumentalities for operating each of said lines independently of the other.

2. In a brake system for vehicles, in combination, brake mechanism, a brake cylinder and piston for rendering said brake mechanism effective, a vacuum line leading to said cylinder to act at one side of the piston, a source of vacuum connected with said vacuum line, a pressure fluid line leading to said cylinder to act upon the opposite side of the piston, the piston being operable by vacuum from the vacuum line and pressure from the fluid pressure line for brake application purposes, and instrumentalities for controlling the application of vacuum and air pressure to the said piston in a sequential relation, said last mentioned instrumentalities comprising a manually operable device initially movable to cause the vacuum in the vacuum line to act upon said piston, and subsequently movable to cause the fluid pressure from the fluid pressure line to act upon said piston.

3. In a brake system for vehicles, in combination, brake mechanism, a brake cylinder and piston for rendering said brake mechanism effective, a vacuum line leading to said cylinder to act at one side of the piston, a source of vacuum connected with said vacuum line, a pressure fluid line leading to said cylinder to act upon the opposite side of the piston, the piston being operable by vacuum from the vacuum line and pressure from the fluid pressure line for brake application purposes, and instrumentalities for controlling the application of vacuum and air pressure to the said piston in a sequential relation, said last mentioned instrumentalities including a manually operable lever movable initially to open the vacuum line to the brake cylinder so that vacuum acts upon the piston therein and subsequently adapted upon subsequent movement to open the fluid pressure line to the brake cylinder to act upon the piston therein at the side of the latter opposite that acted upon by the vacuum in the vacuum line.

4. In a brake system for vehicles, in combination, brake mechanism, a brake cylinder and piston for rendering said brake mechanism effective, a vacuum line leading to said cylinder to act at one side of the piston, a source of vacuum connected with said vacuum line, a pressure fluid line leading to said cylinder to act upon the opposite side of the piston, the piston being operable by vacuum from the vacuum line and pressure from the fluid pressure line for brake application purposes, and instrumentalities for controlling the application of vacuum and air pressure to the said piston, the last mentioned instrumentalities including a foot lever, a valve for opening the vacuum line movable to open and closed positions by actuation of said foot lever, a second valve in the fluid pressure line adapted to open and close the same, a valve operating member connected with the said second valve, and a connection between the foot pedal and the said valve operating member whereby the latter may be operated from the former.

5. In a brake system for vehicles, in combination, brake mechanism, a brake cylinder and piston for rendering said brake mechanism effective, a vacuum line leading to said cylinder to act at one side of the piston, a source of vacuum connected with said vacuum line, a pressure fluid line leading to said cylinder to act upon the opposite side of the piston, the piston being operable by vacuum from the vacuum line and pressure from the fluid pressure line for brake application purposes, and instrumentalities for controlling the application of vacuum and air pressure to the said piston, the last mentioned instrumentalities including a foot lever, a valve for opening the vacuum line movable to open and closed positions by actuation of said foot lever, a second valve in the fluid pressure line adapted to open and close the same, a valve operating member connected with the said second valve, a connection between the foot pedal and the said valve actuating lever whereby the latter may be operated from the former, said connection comprising a structure permitting lost motion between the pedal and the valve actuating member whereby during initial movement of the pedal to open the vacuum valve, the fluid pressure valve will remain closed and during subsequent movement of the pedal after opening of the vacuum valve by its actuation, the said fluid pressure valve actuating member will be operated to open the fluid pressure valve to admit pressure fluid to the brake cylinder.

6. In a brake system for vehicles, in combination, brake mechanism, a brake cylinder and piston for rendering said brake mechanism effective, a vacuum line leading to said cylinder to act at one side of the piston, a source of vacuum connected with said vacuum line, a pressure fluid line leading to said cylinder to act upon the opposite side of the piston, the piston being operable by vacuum from the vacuum line and pressure from the fluid pressure line for brake application purposes, instrumentalities operable independently of each other for applying vacuum from the vacuum line to the piston of the brake cylinder and for supplying pressure fluid from the fluid pressure line to act upon the piston of the brake cylinder, and another instrumentality for causing the pressure fluid in the fluid pressure line to act upon the piston in the brake cylinder connected with the instrumentality which controls the application of vacuum through the vacuum line to the brake cylinder, said first mentioned instrumentality being operable by said last mentioned instrumentality in sequential relation for causing the pressure fluid in the fluid pressure line to be admitted to the brake cylinder.

7. In a brake system for vehicles, in combination, a source of vacuum, a brake cylinder and piston therein, a source of pressure fluid, a vacuum line connecting the source of vacuum to the brake cylinder, a fluid pressure line connecting the source of pressure fluid to the brake cylinder, a manually operable mechanism common to the vacuum line and to the fluid pressure line for opening the same to cause the application of the vacuum and the application of the pressure fluid to the piston in the brake cylinder, a separate manually operable device for controlling the passage of pressure fluid from the source thereof to the brake cylinder, the said manually operable mechanism consisting of a manually movable lever and valve controlling the vacuum line, a manually movable lever and valve controlling the fluid pressure line, and a lost motion connection between the said manually movable lever and valve first mentioned and the second mentioned manually movable lever and valve.

JOHN A. REDD.